US005603061A

United States Patent [19]
Hilley et al.

[11] Patent Number: 5,603,061
[45] Date of Patent: Feb. 11, 1997

[54] METHOD FOR PRIORITIZING MEMORY ACCESS REQUESTS USING A SELECTED PRIORITY CODE

[75] Inventors: Michael R. Hilley, Belton; William J. Kass, Easley, both of S.C.

[73] Assignee: NCR Corporation, Dayton, Ohio

[21] Appl. No.: 587,132

[22] Filed: Jan. 16, 1996

Related U.S. Application Data

[63] Continuation of Ser. No. 98,770, Jul. 28, 1993, abandoned, which is a continuation of Ser. No. 734,418, Jul. 23, 1991, abandoned.

[51] Int. Cl.$^6$ ............................ G06F 13/18; G06F 13/364
[52] U.S. Cl. ............................. 395/864; 395/728; 395/732; 395/860; 395/862; 395/478; 364/DIG. 1
[58] Field of Search ............................ 364/200, 900, 364/518, DIG. 1; 395/425, 725, 166, 728, 732, 860, 478, 864, 862, 861; 340/799

[56] References Cited

U.S. PATENT DOCUMENTS

| | | | |
|---|---|---|---|
| 4,493,036 | 1/1985 | Boudreau et al. | 395/732 |
| 4,536,839 | 8/1985 | Shah et al. | 395/478 |
| 4,558,429 | 12/1985 | Barlow et al. | 395/484 |
| 4,600,992 | 7/1986 | Boudreau et al. | 395/729 |
| 4,654,788 | 3/1987 | Boudreau et al. | 395/287 |
| 4,796,232 | 1/1989 | House | 365/189.03 |
| 4,937,781 | 6/1990 | Lee et al. | 395/887 |
| 4,991,112 | 2/1991 | Callemyn | 395/433 |
| 5,115,507 | 5/1992 | Callemyn | 395/478 |

*Primary Examiner*—Tod Swann
*Assistant Examiner*—J. Peikari
*Attorney, Agent, or Firm*—Douglas S. Foote; Paul J. Maginot

[57] ABSTRACT

A method for controlling access to a memory includes the step of defining a group of priority codes, each of which represents an order for granting simultaneous memory access requests. One of the group of priority codes is selectively provided to a memory controller. A request to access memory is then granted according to the selected priority code.

20 Claims, 6 Drawing Sheets

METHOD FOR PRIORITIZING MEMORY ACCESS REQUESTS USING A SELECTED PRIORITY CODE

This is a continuation of application Ser. No. 08/ 098,770 filed on Jul. 28, 1993, now abandoned, which is a continuation of application of Ser. No. 07/734,418 filed Jul. 23, 1991 now abandoned.

The present invention relates to computer memory systems. More particularly, it relates a method for arbitrating between multiple requests for access to a computer memory.

CROSS-REFERENCE TO RELATED APPLICATIONS

"System and Method for Requesting Access to a Computer Memory for Refreshing" NCR Docket Number 5129.1, filed concurrently herewith, invented by William Jo Kass and Michael R. Hilley.

BACKGROUND OF THE INVENTION

Many computers have multiple entities which require access to a single system memory. For example, multiple processors often compete for access to a single memory for reading and writing of data. Still other entities, such as timers, make periodic access requests to refresh memory. Because memory can not be accessed by more than one entity at a time, some mechanism must be provided to regulate and control multiple, simultaneous access requests.

Many computers have a memory controller to provide such regulation. One of the controller's duties is to arbitrate among competing requests for memory access. In the past, the priority order for granting multiple requests has been predetermined by the system design. This reduces the flexibility of the system and can decay its performance.

OBJECTS OF THE INVENTION

It is therefore an object of the present invention to provide a new and improved method for controlling access to a computer memory.

It is another object of the present invention to provide a method for improving the performance of a computer system.

It is a further object of the present invention to provide a method for increasing the flexibility of a computer memory system.

It is yet another object of the present invention to provide a new and improved method for operating a memory controller.

It is yet a further object of the present invention to provide a method for changing the priority order of memory access requests in a computer system.

SUMMARY OF THE INVENTION

The present invention is a method for controlling access to a memory by providing to a memory controller a code defining a priority order for memory access requests.

More particularly, a group of priority signals is first specified, each of which defines an order for granting simultaneous requests to access memory. One of the group of priority signals is selectively provided to a memory controller. A request to access memory is then granted according to the selected priority signal.

DESCRIPTION OF A PREFERRED EMBODIMENT

Figure 1:
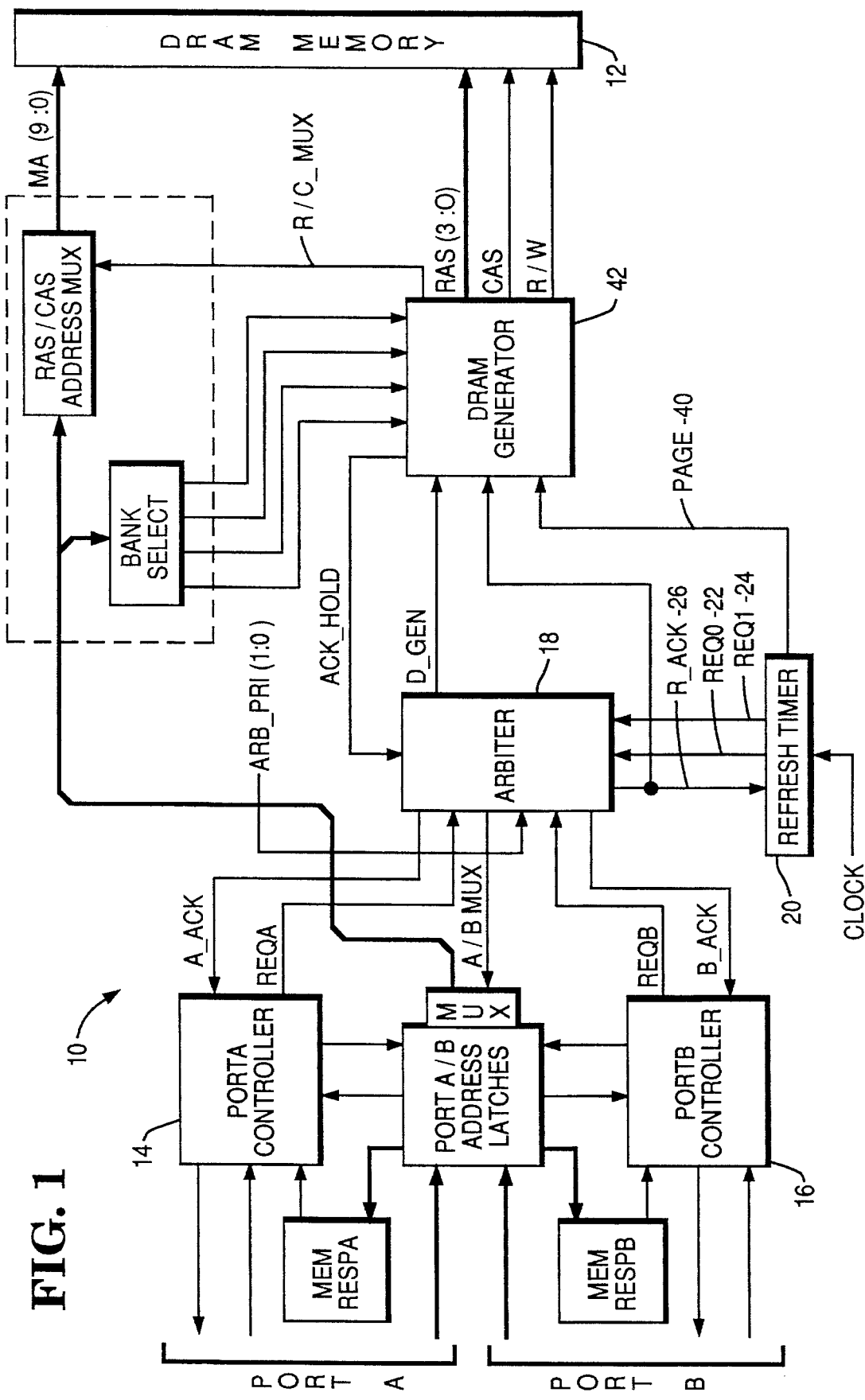
FIG. 1 is a block diagram of a computer memory control system.

FIG. 1 shows a computer memory controller 10. Controller 10 includes a system memory or DRAM 12 which is accessible through two ports (PORT A and PORT B). Buses A and B (not shown) will be connected to ports A and B, respectively. One or more entities, such as microprocessors, which require access to memory 12 will be connected to each bus A and B, respectively. Each port A and B has an associated controller 14 and 16, respectively. Each controller 14 and 16 connects bus A and B, respectively, to an arbiter 18 by a line which transmits a memory access request signal REQA and REQB, respectively. Request signals REQA and REQB are asserted for either a read or write operation to memory 12. Each controller 14 and 16 also has a line for receiving an acknowledge signal A_ACK and B_ACK, respectively, from arbiter 18. An A/B_MUX signal for selecting either the port A or port B address latches is provided from arbiter 18.

Controller 10 also includes a timing circuit or refresh timer 20. Lines 22, 24 and 26 connect timer 20 and arbiter 18. Lines 22 and 24 provide refresh request signals REQ0 and REQ1, respectively, from timer 20 to arbiter 18. Line 26 provides a refresh acknowledge signal R_ACK from arbiter 18 to timer 20. Line 40 connects timer 20 and and DRAM generator 42 and transfers a PAGE signal from timer 20 to generator 42.

Arbiter 18 provides D_GEN and the R_ACK signals to DRAM generator 42 indicating the start of DRAM and refresh cycles, respectively. DRAM generator 42 provides the ACK_HOLD signal to arbiter 18 when generator 42 is performing a memory access. This prevents arbiter 18 from granting other requests while DRAM 12 is busy. The ARB_PRI(1:0) signals are provided to arbiter 18 by a configuration register (not shown).

Figure 2:
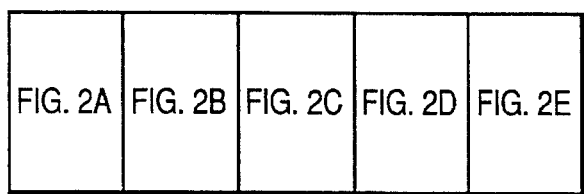
FIG. 2A, 2B, 2C, 2D and 2E together are a circuit diagram of the arbiter shown in FIG. 1.
Figure 2A:
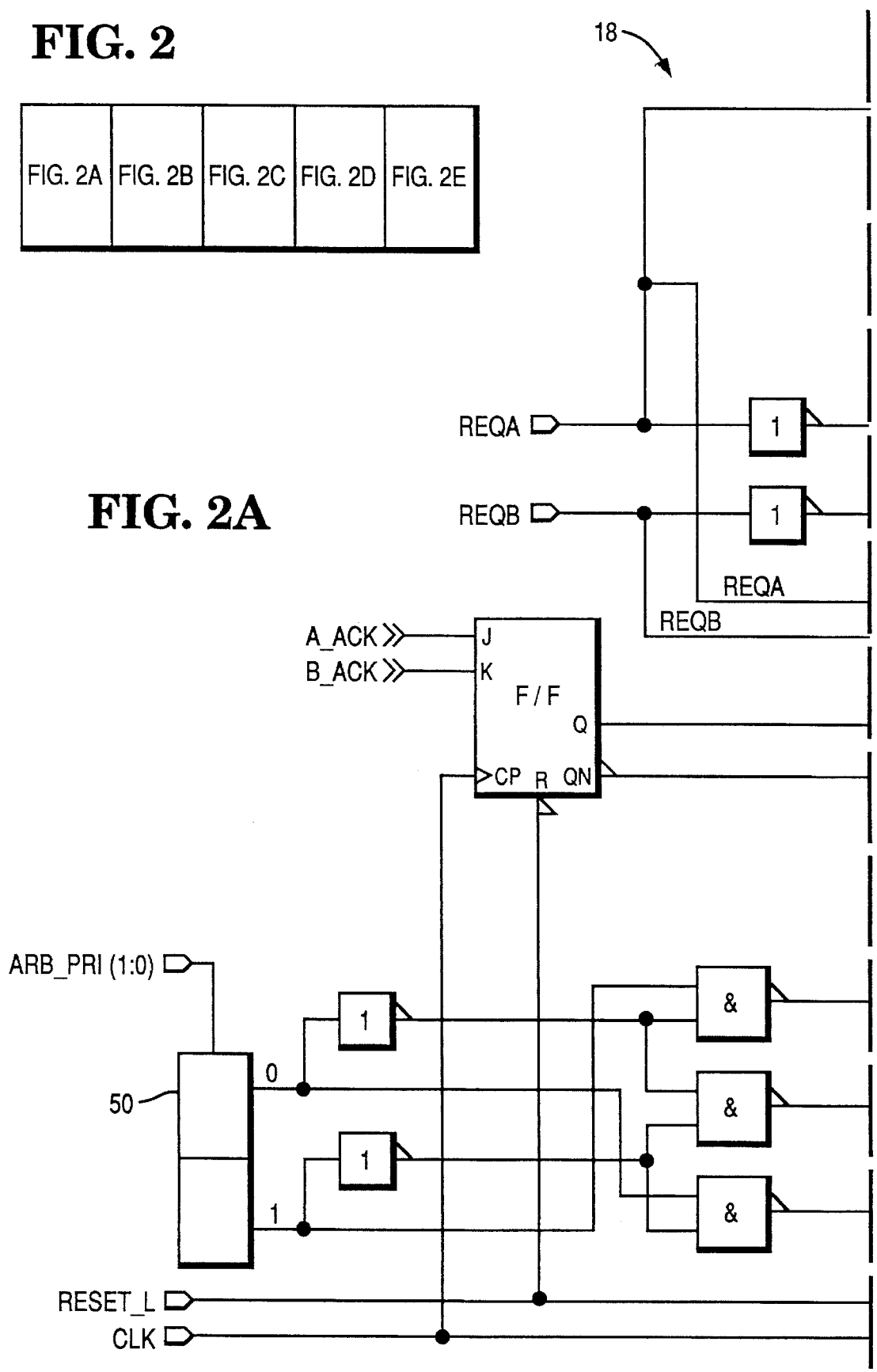
Figure 2B:
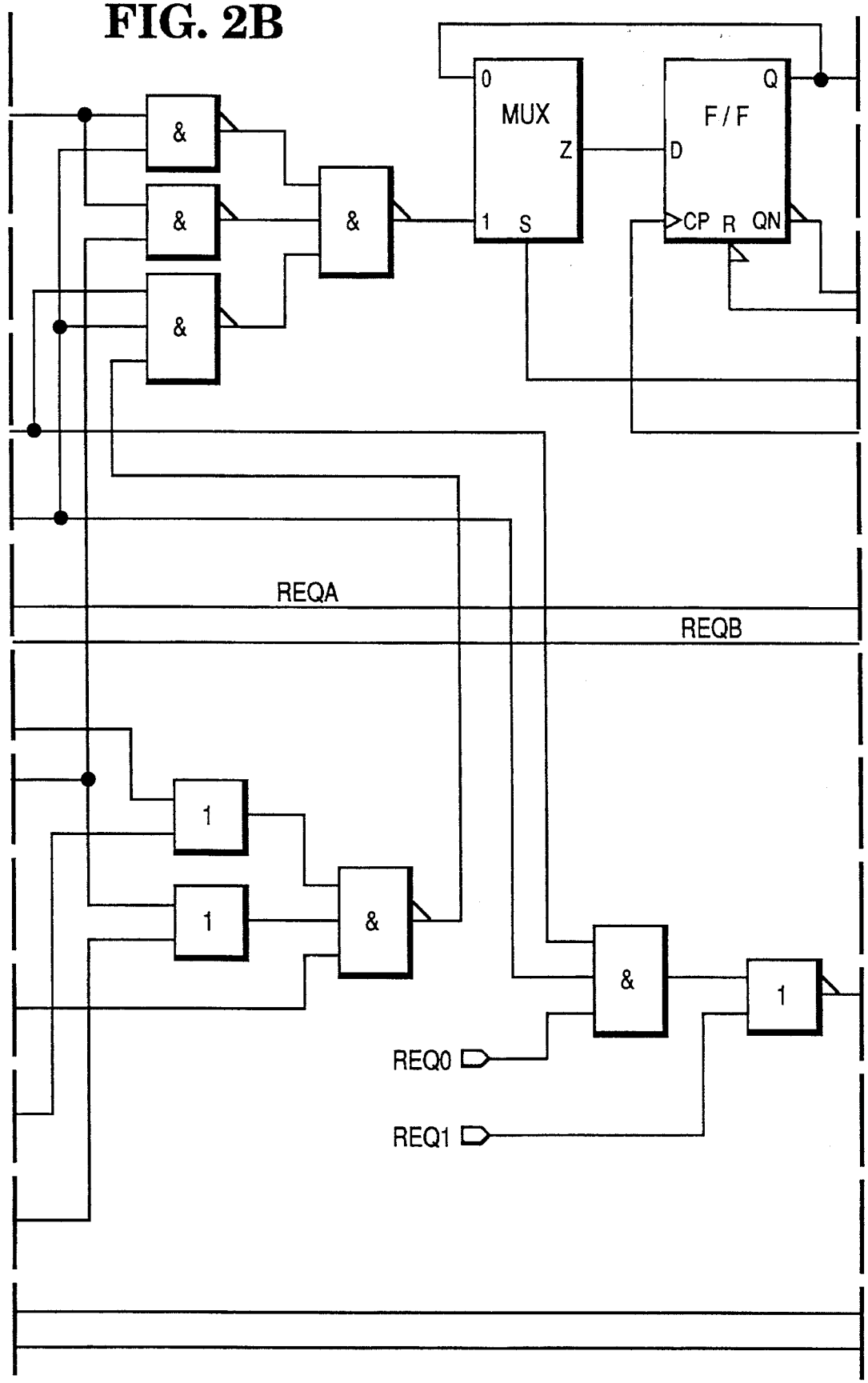
Figure 2C:
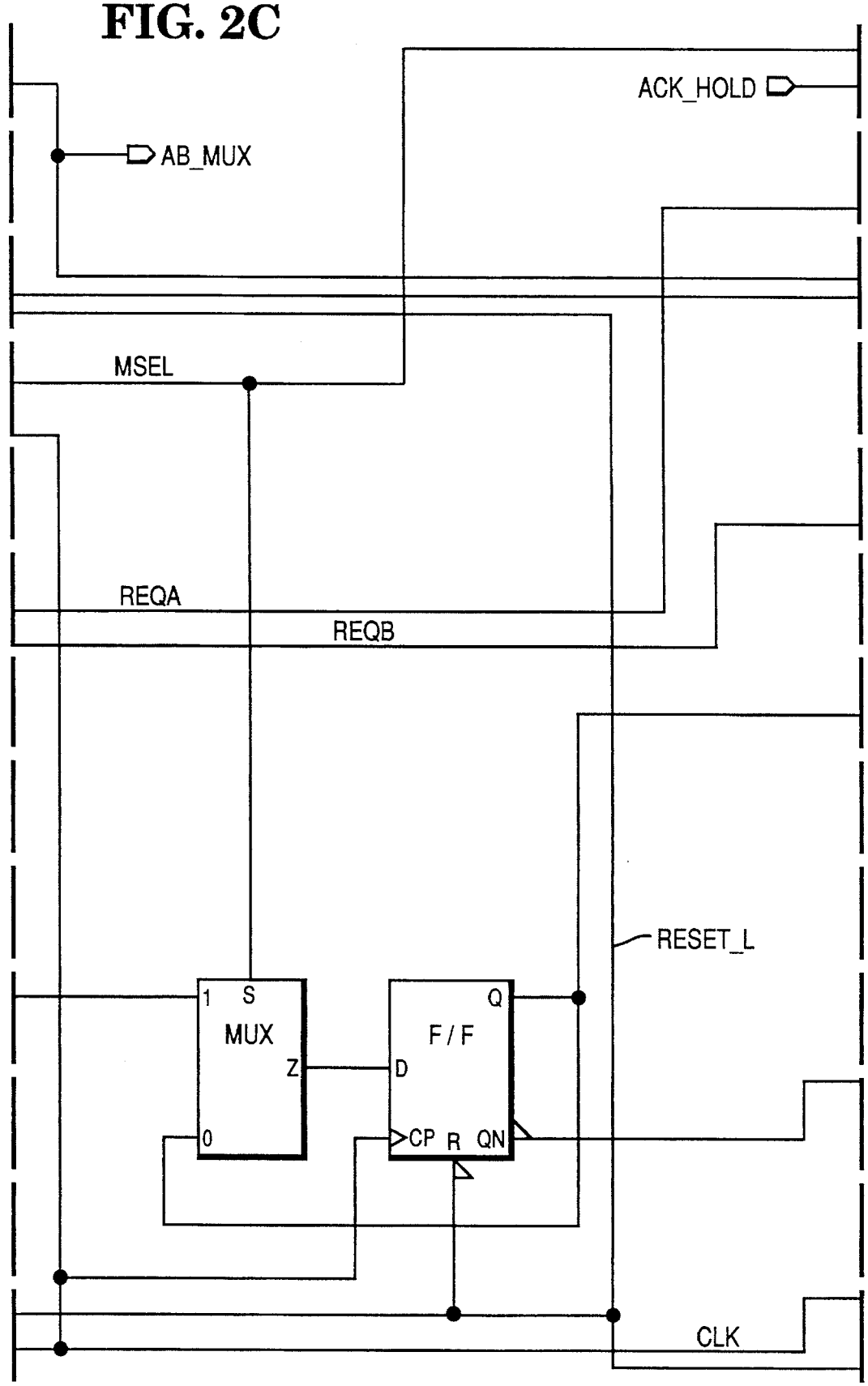
Figure 2D:
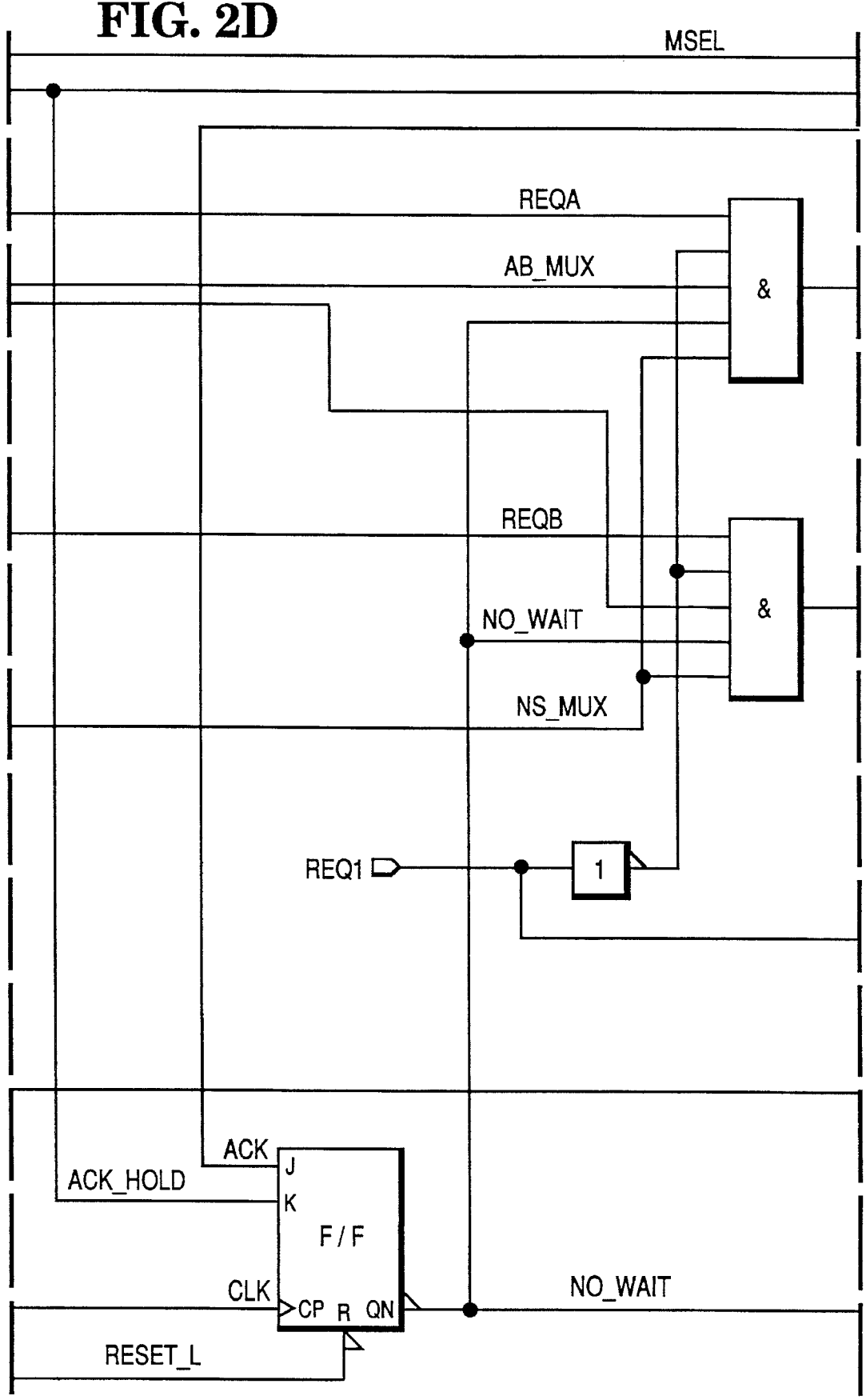
Figure 2E:
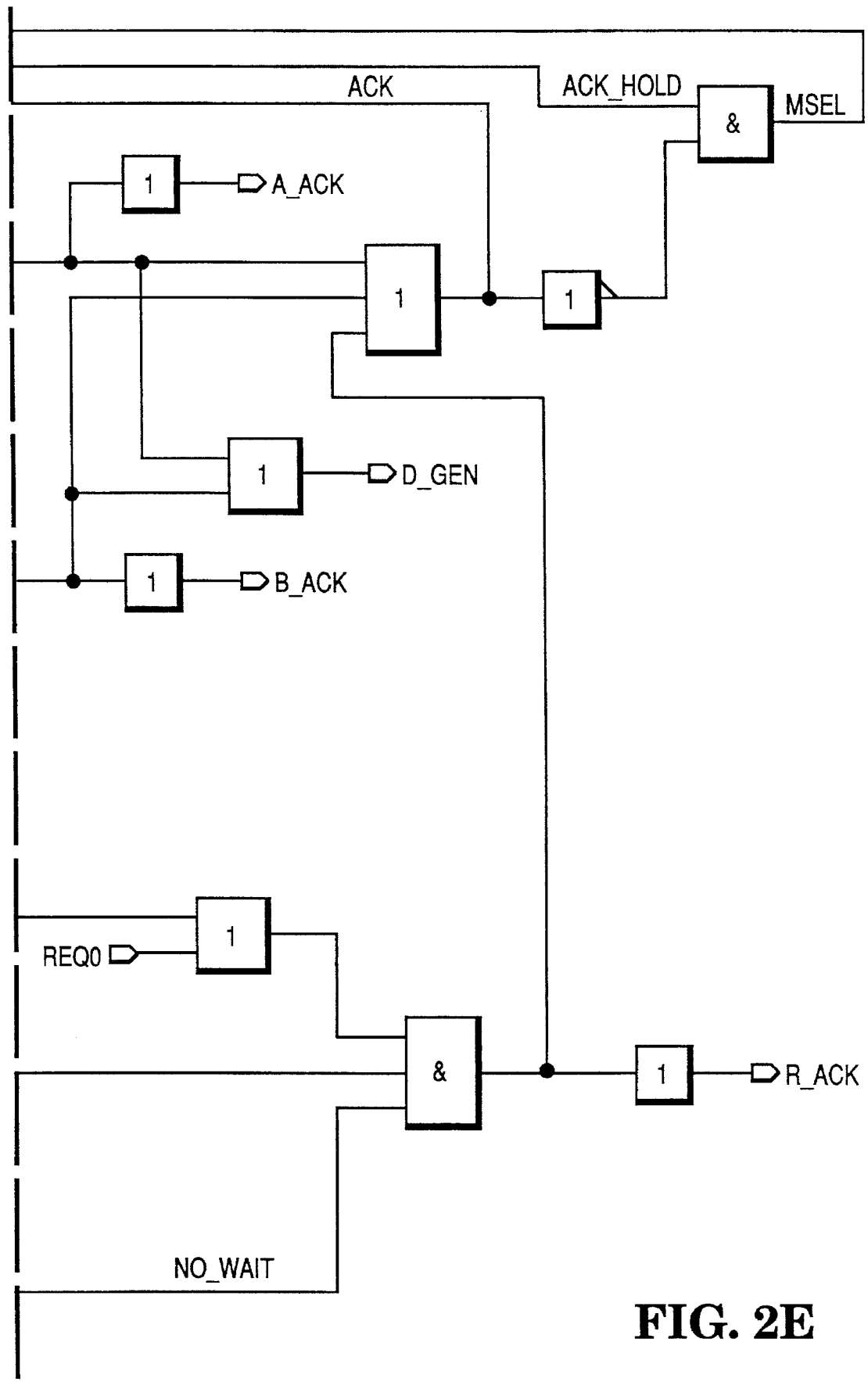

FIGS. 2A–2E, assembled according to FIG. 2, are a logic diagram showing a exemplary embodiment of arbiter 18. FIG. 2A shows a two-bit register 50 for storing a priority code supplied by arbitration priority signals ARB_PRI(1,0).

The arbitration priority signals ARB_PRI(1,0) are a group of priority signals, each of which defines an order for granting simultaneous requests to access memory 12. In the disclosed embodiment, ARB_PRI(1,0) can be set for the following combinations:

| | |
|---|---|
| 00 | Priority Opposite |
| 01 | Priority Last |
| 10 | Priority port A |
| 11 | Priority port B |

Priority Opposite means that the bus or port selected is the last bus not having access to DRAM 12. For example, if an entity on the bus connected to port A accesses DRAM 12, and on the next request cycle there is a contest for memory 12 between entities on buses A and B, the entity on bus B will get access.

Priority Last means that the bus selected is the last bus having access to DRAM 12. For example, if an entity on the bus connected to port A accesses DRAM 12, it will continue to be given priority over bus B as long as bus A requests access. However, when it fails to request access, bus B can be granted access and will continue to be given priority over bus A as long as bus B requests access.

Priority Port A means that an entity connected to bus A will always have priority over bus B for simultaneous memory requests. Similarly, Priority Port B means that an entity connected to bus B will always have priority over bus A for simultaneous memory requests.

In operation, a priority code defined by ARB_PRI(1,0) is selectively provided to register 50. This is done dynamically, i.e. while the computer is running. Preferably, it will be accomplished during system configuration. However, it may also be changed by the user during operation of the computer.

REQA and REQB signals, received simultaneously, are granted according to the priority signal ARB_PRI(1,0) stored in register 50. The term "simultaneous", as used herein, means at about the same time. Clearly, the arbitration scheme is designed to arbitrate between requests received at the same time or within the normal time delay and response time of the circuitry involved. However, a request for access to memory which does not overlap with another request will be granted irrespective of ARB_PRI(1,0). The REQA signal is granted by transmitting the A_ACK signal from arbiter 18 to controller 14. The REQB signal is granted by transmitting the B_ACK signal from arbiter 18 to controller 16.

Timer 20 periodically requests access for refreshing DRAM 12. The REQ0 signal is provided every 15 micro seconds. REQ0 has the lowest priority of all memory access requests. If there are no competing requests, REQ0 is granted and arbiter 18 transmits the R_ACK signal to timer 20. If there are competing requests or if DRAM 12 is busy, REQ0 is not granted. Timer 20 continues to count time and 15 micro seconds later asserts the REQ1 signal. REQ1 has the highest priority of all memory access requests. When either REF0 or REF1 is granted, arbiter 18 transmits the R_ACK signal to timer 20. If REF1 is granted, timer 20 transmits the PAGE signal to DRAM generator 42. The PAGE signal is interpreted by DRAM generator 42 as a request for refreshing two rows of memory in contrast to a single row when REQ0 is granted. This allows the system to have the same amount of memory refreshed as if back-to-back REQ0 signals had been granted.

The priority order of refresh request signals REF0 and REF1 is independent of the priority order for bus requests REQA and REQB defined by the arbitration signal ARB_PRI(1,0). The ARB_PRI(1,0) signal defines the order for acknowledging simultaneous REQA and REQB requests. The REQ0 signal has a lower priority than REQA and REQB, and the REQ1 signal has a higher priority than REQA and REQB.

It will be clear to those skilled in the art that the present invention is not limited to the specific embodiment disclosed and illustrated herein.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. In a computer having a memory, a memory controller and a storage device, a method for controlling access to the memory comprising the steps of:

defining a plurality of priority signal codes, each priority signal code of said plurality of priority signal codes representing an ordering scheme for granting requests to access memory during an occurrence of simultaneous requests to access memory;

selecting one priority signal code of said plurality of priority signal codes;

storing the one priority signal code in the storage device, wherein the contents of the storage device can be changed by a user of the computer from the one priority signal code to a second priority signal code of the of the plurality of priority signal codes;

transmitting the one priority signal code from the storage device to the memory controller;

causing the memory controller to grant a request to access memory according to the ordering scheme of the one priority signal code stored in the storage device;

selecting the second priority signal code;

storing the second priority signal code in the storage device, transmitting the second priority signal code from the storage device to the memory controller; and causing the memory controller to grant another request to access memory according to the ordering scheme of the second priority signal code stored in the storage device.

2. In a computer having a memory, a memory controller and a storage device, a method for controlling access to the memory comprising the steps of:

storing a first priority signal code in said storage device, wherein the contents of the storage device can be changed by a user of the computer from the first priority signal code to a second priority signal code, and further wherein each of said first priority signal code and said second priority signal code defines an ordering scheme for granting requests to access memory during an occurrence of simultaneous requests to access memory;

causing the memory controller to grant a first memory access request according to the ordering scheme defined by said first priority signal code stored in said storage device;

storing the second priority signal code in said storage device; and causing the memory controller to grant a second memory access request according to the ordering scheme defined by said second priority signal code stored in said storage device.

3. The method of claim 2 wherein said first memory access request is granted by transmitting an acknowledge signal from said controller.

4. The method of claim 2 wherein said memory is accessible by device connected to a first bus and a second bus, and wherein each of said first bus and said second bus is connected to said memory controller.

5. The method of claim 4 wherein said first priority signal code defines a priority level for each of:

said first bus;

said second bus;

the last bus having access to said memory; and the last bus not having access to said memory.

6. The method of claim 2 wherein said memory is accessible by means for requesting refresh of said memory and wherein said refresh requesting means is connected to said memory controller by first and second lines which transmit first and second respective memory refresh requests.

7. The method of claim 6 wherein said second refresh request is transmitted to said memory controller at a predetermined time after said first refresh request is denied.

8. A method for arbitrating between multiple requests for access to a computer memory, said multiple requests including first and second requests from respective first and second buses to access the memory, comprising the steps of:

selecting a first priority order for said first and second requests by storing a first priority code in a register, wherein the content of the register can be changed by a user of the computer from the first priority code to a second priority code, and further wherein each of said first priority code and said second priority code defines an ordering scheme for said first and second requests for granting access to the computer memory;

granting access to the computer memory according to the ordering scheme defined by the first priority code selecting a second priority order for said first and second requests by storing a second priority code in the register; and granting access to the computer memory according to the ordering scheme defined by the second priority code.

9. The method of claim 8 further comprising the step of:

simultaneously receiving said first and second requests.

10. The method of claim 8 wherein said multiple requests further include third and fourth requests from a timer to refresh the memory, further comprising the step of:

assigning a priority level to each of the third and fourth requests relative to the other requests of said multiple requests.

11. The method of claim 10 further comprising the step of:

granting access to said computer memory in response to one of the third and fourth requests according to its respective priority level.

12. The method of claim 11, wherein the first request has a higher priority level relative to all the other requests of said multiple requests except the fourth request.

13. The method of claim 11, wherein a request of a bus having the last access to said computer memory has a higher priority level relative to all the other requests of said multiple requests except the fourth request.

14. The method of claim 11 wherein a request of a bus not having the last access to said computer memory has a higher priority level relative to all the other requests of said multiple requests except the fourth request.

15. The method of claim 11 wherein the third request has the lowest priority level relative to all the other requests of said multiple requests.

16. The method of claim 10 wherein the fourth request has the highest priority level relative to all the other requests of said multiple requests.

17. A method for controlling access to a computer memory by devices connected to first and second buses comprising:

connecting a line from each bus to a memory controller for transmitting a respective memory access request;

defining a plurality of priority signal codes including a first priority signal code and a second priority signal code, each priority signal code of said plurality of priority signal codes representing an ordering scheme for granting requests to access memory during an occurrence of simultaneous requests to access memory;

selecting the first priority signal code of said plurality of signal codes;

storing the first priority signal code in a storage device, wherein the contents of the storage device can be changed by a user of the computer from the first priority signal code to a second priority signal code;

transmitting the first priority signal code from the storage device to said memory controller;

causing the memory controller to grant a request to access memory according to the ordering scheme of the first priority signal code by transmitting an acknowledge signal from said memory controller;

replacing the first priority signal code with the second priority signal code in the storage device;

transmitting the second priority signal code from the storage device to said memory controller; and causing the memory controller to grant another request to access memory according to the ordering scheme of the second priority signal code by transmitting an acknowledge signal from said memory controller.

18. The method of claim 17 wherein said first priority signal code defines a priority level for each of:

said first bus;

said second bus;

the last bus having access to said memory; and the last bus not having access to said memory.

19. The method of claim 18 wherein said memory is accessible by means for requesting refresh of said memory and wherein said refresh requesting means is connected to said controller by first and second lines which transmit first and second respective memory refresh requests, and wherein said second request is transmitted to said controller at a predetermined time after said first request is denied.

20. A method for controlling access to a memory, comprising the steps of:

storing a first priority code in a storage device, transmitting the first priority code from the storage device to a memory controller and granting requests to access memory according to the ordering scheme of the first priority code, wherein the contents of the storage device can be changed by a user of the computer from the first priority code to a second priority code, and further wherein said first priority code and said second priority code each defines an ordering scheme for granting access to the memory during an occurrence of simultaneous memory access requests; and replacing the first priority code with the second priority code in the storage device, transmitting the second priority code from the storage device to the memory controller and granting requests to access memory according to the ordering scheme of the second priority code.

* * * * *